INVENTORS
A. SANDER BUCHMAN
HOWARD B. ERLICK
BY
ATTORNEY

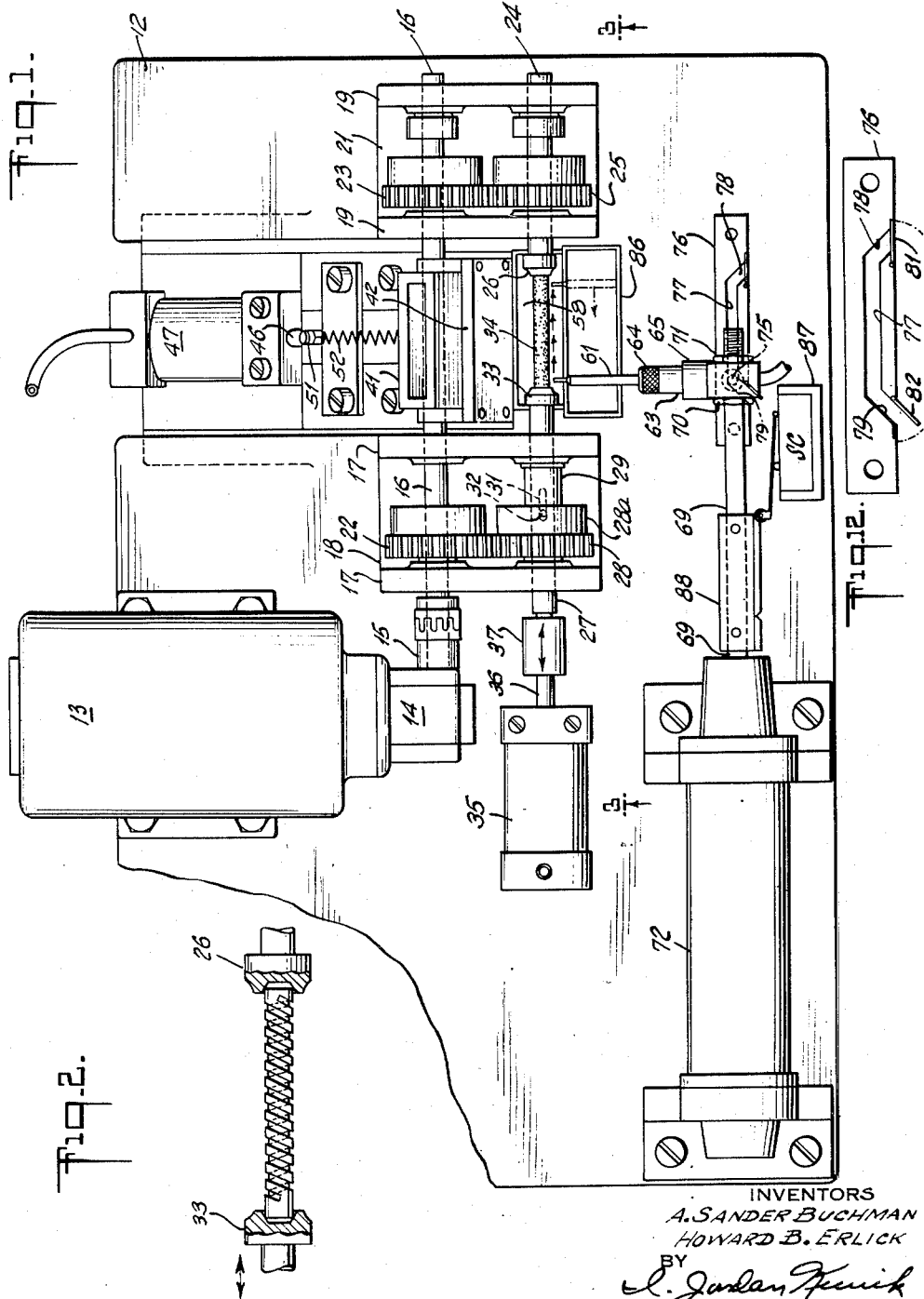

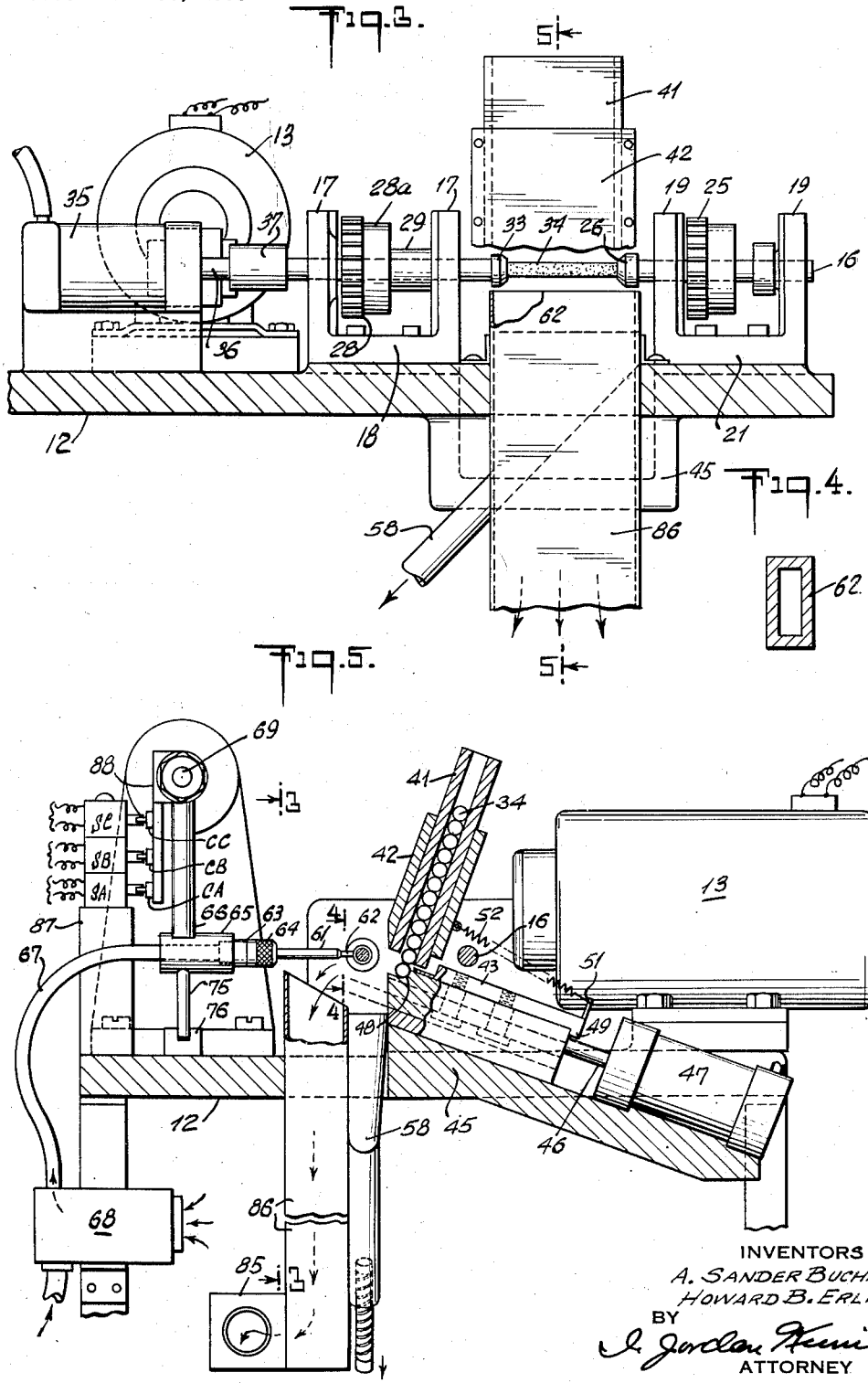

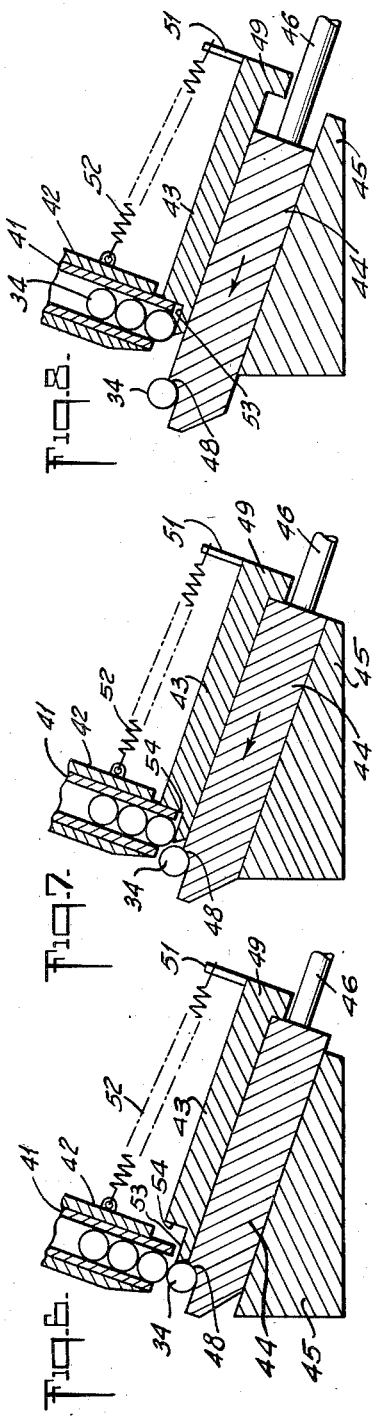
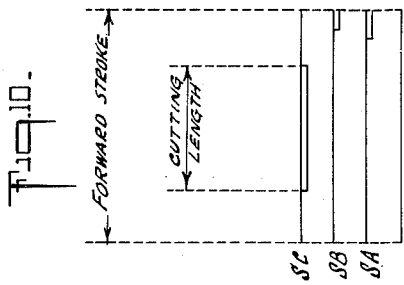
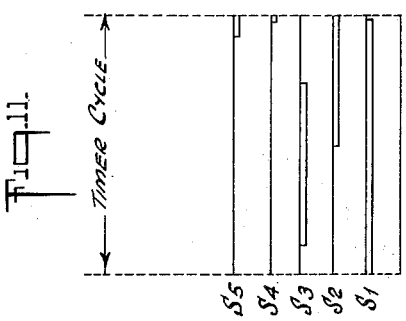
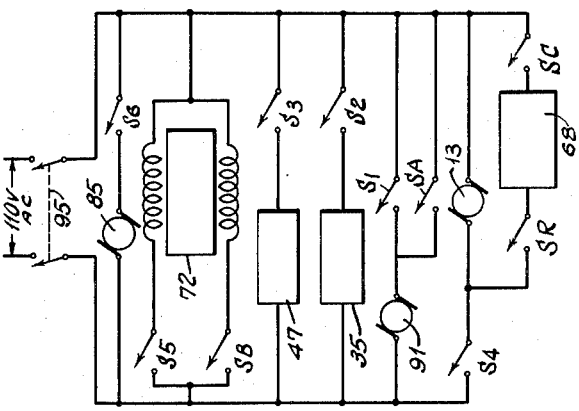
INVENTORS
A. SANDER BUCHMAN
HOWARD B. ERLICK
BY
ATTORNEY Dec. 11, 1956 A. S. BUCHMAN ET AL 2,773,332
MACHINE AND METHOD FOR CUTTING HELICAL FILM RESISTORS
Filed Oct. 30, 1953 4 Sheets-Sheet 4

United States Patent Office 2,773,332
Patented Dec. 11, 1956

2,773,332

MACHINE AND METHOD FOR CUTTING HELICAL FILM RESISTORS

A. Sander Buchman and Howard B. Erlick, Philadelphia, Pa., assignors to Shallcross Manufacturing Company, Collingdale, Pa.

Application October 30, 1953, Serial No. 389,414

3 Claims. (Cl. 51—15)

This invention relates to deposited film resistors and more particularly to an improved method and a novel machine for producing helically cut paths in the resistive films of such resistors.

In the production of deposited film resistors, the resistance material, such as carbon, borocarbon, or other materials, is deposited in a more or less thin film of the order of two to one hundred millionths of an inch thick upon a rod made of ceramic or other suitable insulating materials; and it is often desirable to increase the resistance value by providing a helical cut completely through the film extending along the length of the rod. Since the deposited resistive film is of the order of a few ten thousandths of an inch thick, it is apparent that only a very small depth of cut is required. In the past, diamond wheels have been utilized to produce such a cut, but it is evident that any slight or moderate overcutting will cause the diamond wheel to grind into the ceramic base; and if such a cut is too deep, deleterious heat is generated causing damage to the deposited film.

Another disadvantage of utilizing a diamond wheel is that it is difficult to maintain precise tolerances since the surfaces of the ceramic base rods are not perfectly straight and it is therefore impossible to mount them firmly in relation to the wheel. Since the rod may be irregular in its surface, it is necessary to permit either the rod or the wheel to move relative to the other in some adjustable or automatic fashion in order to compensate for such irregularities. This requires a pressure sensitive system which makes the design and construction of such a grinding machine extremely complicated. Also, if a pressure sensitive system is provided, it is obvious that vibrations induced by the operation of the machine become a major problem, such vibrations tending to cause the diamond wheel to cut to an uneven depth and to cause chipping of the deposited film along the edges of the path of the cut.

Moreover, in order to ensure free cutting, the diamond wheel must be cleaned by means of a fluid spray; and since it is advantageous to use a coolant while the diamond wheel grinds through the film, this produces a wet cutting operation, as a result of which precautions must be taken to dry the rod and to protect the machine from the coolant.

We have, therefore, devised a machine and method for cutting helical paths in deposited resistive film on ceramic rods, the salient feature of which is the utilization of a fluid stream containing abrasive particles which obviates the difficulties described hereinabove.

The operation of this machine consists of feeding an uncut deposited film resistor rod into a working position, after which the mechanism is actuated in a manner to cause the rod to rotate. A jet nozzle for the abrasive stream is arranged to move in a linear path relative to the longitudinal dimension of the resistor rod, and while the rod rotates, the stream of abrasive particles is projected at the rod to cut a helical path completely out of the deposited film. By means of suitable electrical controls the abrasive stream is caused to start at a proper time at or near one end of the rod and to continue its cutting action until the helical path is completed at or near the other end of the rod, at which time the controls cause the abrasive stream to stop. The deposited film resistor with a helical cut is then ejected automatically in a suitable manner.

The abrasive stream nozzle is then brought back to its zero position, another uncut deposited film resistor rod is fed into working position, and the cycle is repeated.

In another embodiment, the fluid abrasive nozzle may be stationary and the rotating film deposited resistor may be moved longitudinally past said nozzle in order to cut the helical path.

A notable feature of the present invention is that the method does not require any intimate contact between the film deposited resistor and the abrasive stream nozzle itself. In some embodiments, the distance between the rod and the nozzle may be of the order of about .035" and this distance can be varied by about plus or minus .015", without causing any notable effect on the helical cut. By positioning the nozzle so closely to the surface of the deposited resistor, the abrasive stream is projected at the resistive film within a confined area thereof so that a substantially sharp cut is made through the film down to the ceramic base without permitting any of the abrasive particles to spray outward to damage the resistive film that is to remain on the base. Additionally, the depth of the cut remains quite uniform and the operation can be performed at very high speeds, as for example, by rotating the film deposited rod as fast as 250 turns per minute.

As compared to other machines for producing helical cuts in deposited film resistors, the machine of the present invention is considerably smaller and less expensive, and may be built more ruggedly with less complicated controlling devices. A simple loading system is provided, and the accurate cutting of the helical path is not affected by any vibrations that may either be generated by the machine or which may be externally caused.

The fluid abrasive stream can be arranged to start and stop at any desired points with a high degree of accuracy as predetermined by the desired resistance values. This is accomplished either by setting up automatic start and stop switching mechanisms which operate according to dimensional standards or by means of a continual monitoring of the resistance value being produced on the resistor, the monitoring mechanism being arranged automatically to stop the flow of the abrasive stream when the desired resistance is achieved.

Other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawings, in which:

Figure 1 is a top plan view of the machine of the present invention, shown partly in phantom outline;

Fig. 2 is a slightly enlarged view, partly in phantom outline, of one form of a helically cut deposited film resistor, showing the manner in which it is held in chucks which are shown partly in cross-section;

Fig. 3 is a front view, partly in elevation, partly in section and partly in phantom outline, taken on line 3—3 of Fig. 1;

Fig. 4 is a greatly enlarged cross section view of the abrasive stream jet nozzle;

Fig. 5 is a view taken on line 5—5 of Fig. 3;

Figs. 6, 7 and 8 are slightly enlarged cross section views of a portion of Fig. 5 showing the feed mechanism for the ceramic bodies and indicating the successive positions of the operative parts as they perform their functions;

Fig. 9 is a schematic electrical circuit diagram of the apparatus described herein;

Fig. 10 is a diagrammatic representation of the time cycle operation of some of the operative elements of the machine;

Fig. 11 is a diagrammatic representation of the time cycle operation of other operative elements of the machine;

Fig. 12 is a top view of the guide channel for the abrasive jet nozzle;

Figure 13:
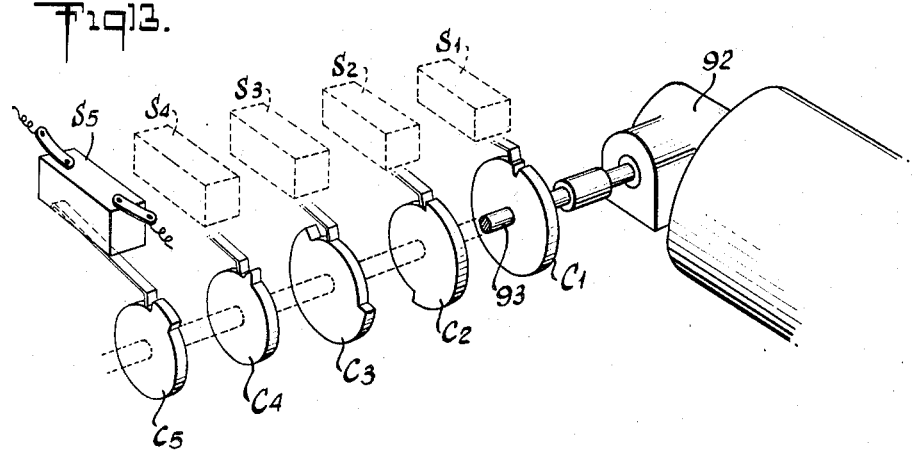
Fig. 13 is a schematic representation of the time cycle motor and the various cams and switches operated thereby.

Referring now to the drawings in detail, the machine of the present invention which is mounted on platform 12 comprises a motor 13, which, through the intermediary of gear box 14 and drive shaft 15, rotates shaft 16 which extends through and is supported by vertical pairs of uprights 17 and 19 mounted on frames 18 and 21, positioned respectively on platform 12. Suitable bearings (not shown) are provided for the free rotation of shaft 16 within uprights 17 and 19. Mounted on shaft 16 between uprights 17 is a gear 22 and mounted on shaft 16 between uprights 19 is a gear 23. Supported rotatably within suitable bearings in uprights 19 is a second shaft 24. Connected to and rotating with shaft 24 is a gear 25 which meshes with gear 23 and is driven thereby to cause rotation of shaft 24. Attached to the left end of shaft 24 is a chuck 26 which is adapted to grasp one end of a resistor body and to rotate it.

Supported rotatably within suitable bearings (not shown) in uprights 17 is a third shaft 27 which is also movable longitudinally within said bearings. Mounted around shaft 27 is a gear 28 which is adapted to mesh with gear 22. Since shaft 27 is movable longitudinally, there is provided a sleeve 29 mounted over said shaft and which bears against hub 28a of gear 28 to prevent said gear from moving out of engagement with gear 22. In order for gear 28 to cause rotation of shaft 27, there is provided in shaft 27 a longitudinal slot 31 into which there extends pin 32 connected to the internal periphery of hub 28. Whatever the position of shaft 27, gear 28 is operative to rotate said shaft by virtue of pin 32 engaging the walls of slots 31, while at the same time the longitudinal movement of shaft 27 is permitted in certain circumstances to be described hereinbelow.

Connected to the right end of shaft 27 is a chuck 33 which is adapted to grasp an end of a cylindrically shaped resistor body 34 and rotate it around its longitudinal axis in cooperation with chuck 26.

Longitudinal movement for shaft 27 is provided by an air cylinder 35 whose non-rotating output shaft 36 is connected to shaft 27 by a suitable thrust bearing 37 which permits shaft 27 to rotate. Air cylinder 35 is operated by the closing of an electric switch (to be described below) to move shaft 27 to the right (Fig. 1). Upon the opening of said switch, shaft 27 is retracted by means of a spring return mechanism (not shown) within the casing of cylinder 35.

As will be described hereinbelow, air cylinder 35 is actuated on a time cycle basis to move chucking head 33 in and out to grasp succeeding resistor bodies 34 as they are fed into chucking position.

Resistor bodies 34 are fed to the chucking position from an upwardly extending hopper 41 mounted somewhat to the rear of the region between chucks 26 and 33. See Figs. 3 and 5. Hopper 41 is attached to a frame 42 which is connected to platform 12 by suitable means (not shown).

The intermittent feed mechanism for the resistor bodies comprises a pair of slides 43 and 44, slide 43 being slidable over the top surface of slide 44. See Figs. 5, 6, 7 and 8. Slide 44 is slidable over the inclined surface of stationary base 45 which is mounted on platform 12. Connected to the rear of slide 44 is a bar 46 moved longitudinally by means of air cylinder 47 which operates according to a time cycle arrangement, as will be described hereinbelow.

Air cylinder 47 and bar 46 operate to move slide 44 longitudinally over base 45. Slide 44 has in its forward upper surface a depression 48 which is adapted to accommodate a resistor rod that drops from hopper 41. When slide 44 is retracted to its rearward position as represented in Fig. 6, slide 43 is also retracted by virtue of downwardly extending leg 49 of slide 43 which overhangs the rear end of slide 44. Slide 43 also has an upright pin 51 upon which one end of spring 52 is connected, the other end of said spring being connected to frame 42 whereby both slides 43 and 44 are normally urged towards said frame.

An extension 53 on the front end of slide 44 serves to close the mouth of hopper 41 when slide 44 is delivering a resistor body to the chucking mechanism. The forward motion of slide 43 is limited by shoulder 54 abutting the side of hopper 41, as shown in Fig. 7. The action of air cylinder 47 continues, however, to push slide 44 forward, carrying resistor body 34 to the chucking position (Fig. 8) while extension 53 has moved into position to close the mouth of the hopper, thereby preventing the escape of the remaining resistor bodies.

Air cylinder 47 is operated by the closing of an electric switch (to be described below) to move slide 44 forward. Upon the opening of said switch, slide 44 is retracted by means of a conventional spring return mechanism (not shown) within the casing of cylinder 47.

Mounted in a suitable slot in platform 12 in a position below the chucking mechanism is a chute 58 (Figs. 3 and 5) into which the film-deposited ceramic bodies fall after they have been provided with a helical track.

The helical path in the film deposited resistor body as shown in Fig. 2, is produced by an air abrasive system that comprises a high speed jet of fine abrasive particles which are projected against rotating ceramic body 34. This abrasive stream is projected through a tube 61 (Figs. 1 and 6) having at its end a nozzle 62, a greatly enlarged section of which is shown in Fig. 4. While the cross section of the nozzle may take different suitable shapes, the rectangular form shown in Fig. 4 produces excellent results.

Tube 61 is mounted in arbor 63 which has suitable threadings and a chucking arrangement (not shown) which permits the adjustment of the distance of the end of nozzle 62 from the resistor body by means of knurled ring 64. Arbor 63 is connected to a fitting 65 which is attached to a generally vertical bar 66. Extending through fitting 65 and arbor 63 is a tube 67 which supplies the abrasive stream to tube 61 from abrasive stream generator 68, shown schematically in Fig. 5.

Bar 66 is pivotally mounted near the end of horizontal shaft 69, the desired position of said bar thereon being adjustably fixed by means of nuts 70 and 71, respectively, threaded on shaft 69. Shaft 69 is connected to the piston of an air cylinder 72 whose action produces longitudinal motion of shaft 69 and thereby a longitudinal motion of nozzle 62 relative to the longitudinal dimension of resistor body 34 within chucks 26 and 33.

Air cylinder 72 is operated by the closing of an electric switch (to be described below) to move shaft 69 to the right (Fig. 1). The actuation of a second switch (described below) operates a valve (not shown) which reverses the air flow in said cylinder, thereby retracting shaft 69 to the left.

Bar 66 has an extension 75, the lower end of which is adapted to engage a tracking guide element 76 mounted on platform 12. See Figs. 1, 5 and 12. Guide 76 has a channel 77 substantially parallel to the longitudinal dimension of resistor body 34 when maintained in the chucking position. Channel 77 serves to guide the mounting means for air abrasive nozzle 62 so that in its longitudinal movement it is maintained in a straight line that is substantially parallel to the peripheral surface of the resistor body 34 that is being cut by the air abrasive stream. On either end of channel 77 are angled channels 78 and 79, respectively, which serve to pivot extension 75 and bar 66, thereby preventing air abrasive jet nozzle 62 from colliding with chucks 26 and 33, respectively.

When extension 75 moves out of and to the right of channel 78, the lower end of extension 75 pushes away and passes beyond the edge of hinged gate 81 which normally closes channel 78 under the action of a spring (not shown). On its return left to the starting position, as shown in Fig. 1, the lower end of extension 75 passes over normally open, hinged gate 82, and closes it against channel 79. As extension 75 passes beyond the end of gate 82, the latter automatically opens channel 79 under the action of a spring (not shown). As the air abrasive mechanism is again moved to the right by shaft 68 under the action of air cylinder 72 during a succeeding cycle, extension 75 is caught by gate 82 and urged into channel 79 which brings jet nozzle 62 into the proper position for projecting the air abrasive stream against the film deposited resistor body.

As will be explained below, the abrasive stream is controllably timed whereby it is projected from nozzle 62 only only while extension 75 travels in channel 77, and even then only within certain predetermined limits defined by the desired length of the helical path on the coated resistor. These limits are preferably shorter than the length of the resistor body in order to prevent abrasive particles from impinging upon the chucking means or other mechanisms beyond a certain distance from the ends of the ceramic bodies, since such high speed abrasives might otherwise injure certain parts of the machine.

After they have impinged upon the coated resistor body, the abrasive particles are drawn off by suction mechanism 85 through chute 86 (Fig. 5), the mouth of which is positioned somewhat below nozzle 62. Other suitable suction chambers may be positioned strategically near nozzle 62 and resistor body 34 for drawing off escaping abrasive particles.

Positioned on platform 12 is a bracket 87 (Figs. 1 and 5) upon which are stacked switches SA, SB and SC, of the microswitch type, said switches being arranged vertically and each having independent switch arms. Attached to bar 69 that carries the fluid abrasive nozzle is downwardly extending bracket 88 upon which are mounted three linear cams CA, CB and CC, in a vertical array and operative to actuate the respective switch arms of switches SA, SB and SC.

The respective operating lengths of linear cams CA, CB and CC are represented schematically in Fig. 10. As bar 69 makes its forward stroke to the right (Fig. 1), the action of cams CA, CB and CC activate several of the functions of the machine, as will be explained more completely hereinafter.

Cooperating with switches SA, SB and SC, to control the functions of various other operating elements of the film cutting machine is a single cycle timer shown diagrammatically in Fig. 13. This timer is activated by motor 91 connected through switches S1 and SA to the power source (Fig. 9), and operates through a suitable gear box 92 to rotate timer shaft 93 upon which cams C1, C2, C3, C4 and C5 are rotatably mounted. Each of said cams is adapted to operate a corresponding switch S1, S2, S3, S4 and S5, respectively.

Switch S1 operates timing motor 91, switch S2 operates chucking air cylinder 35, switch S3 operates feeder cylinder 47, switch S4 operates the slug rotation motor 13, and switch S5 activates the forward stroke of air cylinder 72.

Switch SA, when actuated to close (see Figs. 10 and 11), starts timer motor 91, thereby starting the timing cycle of the other machine components. Switch SB actuates the return stroke of air cylinder 72, while switch SC operates blower 68 to project the fluid abrasive stream through nozzle 62 to cut the helical path on the deposited film resistor while the latter rotates.

It will be understood from the schematic illustrations of Figs. 10 and 11, the widened portions of the horizontal lines indicate the time during which the respective switches are operative.

When line switch 95 (Fig. 9) is closed, and the forward stroke of air cylinder 72 is started, switch S5 being closed, the cycle of operations of switches SA, SB and SC is started by the forward movement of bar 69 carrying linear cams CA, CB and CC. As bar 69 moves forward and after the lower end of extension 75 enters guide channel 77, cam CC actuates switch SC at the proper time to start blower 68 projecting the fluid abrasive stream through nozzle 62.

The period during which switch SC is closed by cam CC upon the forward stroke of bar 69 determines the time during which the fluid abrasive stream is being projected through nozzle 62. When the end of the required helical cut is reached, switch SC opens and the fluid abrasive stream stops, after which nozzle 62 is retracted by extension 75 moving from guide channel 77 to channel 78.

As bar 69 continues its forward stroke, cam CA activates switch SA to operate timer motor 91 to start the time cycle operation again for switches S1, S2, S3, S4 and S5. Also at a later point towards the end of the forward motion of bar 69, switch SB is actuated to cause air cylinder 72 to retract bar 69 to its original position.

While switch SA is closed causing timer motor 91 to start, cam C1 on timer shaft 93 closes switch S1 which assures the continued operation of the timer motor, which also operates the other cams for activating the other components of the machine. When switch SA is opened, switch S1 remains closed for the remainder of the operative cycle shown in Fig. 11.

At the beginning of the timer cycle operation represented by Fig. 11, switch S2 is opened, causing chuck cylinder 35 to retract, thereby releasing the helically cut resistor which falls into discharge chute 58. Switch S3 then closes to cause feeder cylinder 47 to push forward and deliver a fresh resistor body to the chucking position. Shortly thereafter, switch S2 is closed again to cause air cylinder 35 to move chuck 33 forward to engage the new resistor body 34 between itself and chuck 26, after which switch S3 is opened to permit air cylinder 47 to retract feeder slide 44 out of the way.

The deposited film resistor is now ready for cutting. Switch S5 is then actuated to cause the forward stroke of air cylinder 72. In one embodiment, switches S5 and SB, which operate cylinder 72, are actuated by impulse only and need not be maintained continually in closed position, thereby providing for operation of bar 69 independently of the timer cycle (Fig. 11) after said bar begins its forward motion.

As air cylinder 72 begins the forward stroke of bar 69, switch S4 is operated shortly thereafter to cause motor 13 to rotate slug 34 at a uniform speed between chucks 33 and 26.

Upon completion of the timing cycle of Fig. 11, motor 91 stops by the opening of switch S1; nevertheless the forward stroke of bar 69 continues as shown in Fig. 10 to operate the cycles of switches SA, SB and SC, as described above.

It will also be noted from Fig. 9, that exhaust blower motor 85 that draws off the spent abrasive through chamber 86 may also be connected in parallel to the electrical circuit shown, and its switch S6 may be operated manually and independently of the other timing operations of the machine, or it may be connected to the main line switch so that, as a safety measure, any escaping abrasive particles will always be drawn away from the working parts of the machine as it operates.

The schematic illustrations of Figs. 10 and 11 are not intended to be interpreted as operating on the same time basis since the length of the timer cycle (Fig. 11) is controlled by the speed of timer motor 91, while the length of time required for the forward stroke of bar 69 (Fig. 10) will vary, depending upon the linear velocity of air cylinder 72. Air cylinder 72 may be adjusted as desired to control the velocity of bar 69 and the pitch cut on the resistor during the forward stroke.

The machine of the present invention may also be adapted automatically to produce film deposited resistors of a desired resistance value. As the helical cut is being made in the deposited film, a continual measurement may be made of the resistance value of the deposited film until a desired value is reached, at which time the abrasive cutting stream is stopped automatically by switch SR, as indicated in Fig. 9.

Figure 14:
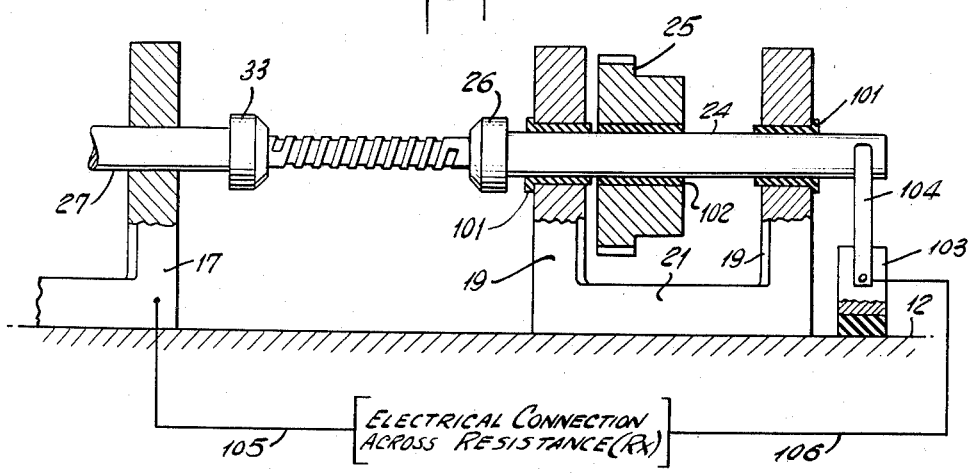
Fig. 14 is a partly sectional view, greatly enlarged, of a modified chucking structure to provide an added resistance monitoring arrangement.

This is accomplished, as shown in Fig. 14, by mounting the right hand chuck shaft 24 within bushings 101 in the uprights 19 of bracket 21, said bushings being made of suitable insulating material. Also, gear 25 would be connected to shaft 24 by means of ring 102 made of insulating material. Hence, shaft 24 would be electrically isolated from its mounting and from its source of rotation.

Figure 15:
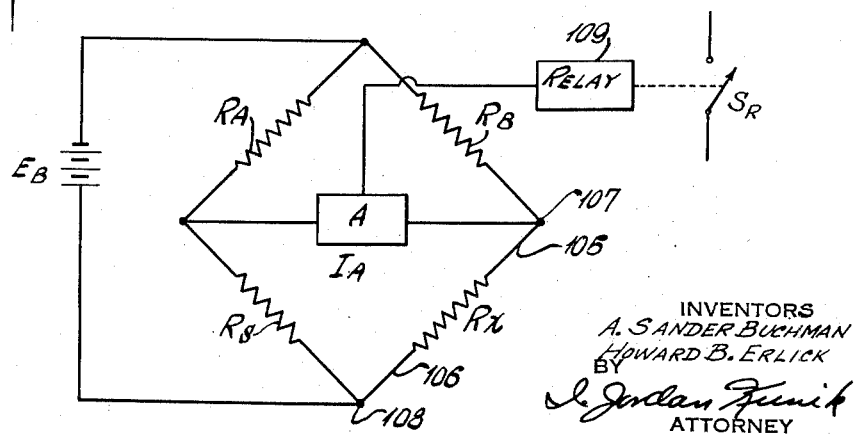
Fig. 15 is a schematic circuit diagram of the resistance monitoring arrangement described herein.

Attached to, and electrically isolated from, platform 12 is a bracket 103, upon which is mounted a spring contact arm 104, whose free end is biased against the periphery of shaft 24. A film coated resistor rod 34 is grasped by chucks 26 and 33. The resistive film on one end of said rod is electrically connected through chuck 33, shaft 27, and upright 17 to lead wire 105, while the resistive film on the other end of said rod is electrically connected through chuck 26, shaft 24 and contact arm 104 to lead wire 106. Lead wires 105 and 106 are connected to binding posts 107 and 108, respectively, of a Wheatstone bridge, as shown in Fig. 15.

The Wheatstone bridge comprises a voltage supply EB, ratio resistors RA and RB, a standard resistor RS of the desired value, an amplifier A connected across the bridge, while RX represents the resistor that is grasped in the machine between chucks 26 and 33. The output of the amplifier is connected to a relay 109 which in turn controls switch SR.

In the operation of this bridge, when RA equals RB, then current will flow through the amplifier provided RX is less than RS. While the deposited film of resistor RX is being given a helical cut with the abrasive stream, the resistance value increases since the resistance path of the film increases, and therefore the current IA decreases until it becomes zero, a condition that obtains when RX equals RS. Since amplifier A is arranged to be sensitive to zero current flow, and such condition is achieved when RX equals RS, relay 109 will then be energized to open switch SR, thereby instantly cutting off the flow of the fluid abrasive stream. See Fig. 9.

Switch SR reacts very quickly to the impulse of relay 109, and blower 63 stops practically immediately upon the opening of said switch. In other types of machines, such as the diamond wheel embodiment where it is necessary to move the resistor rod away from the wheel in order to stop the cutting action, there is a troublesome delay time which must be compensated for. In the machine of the present invention, however, this delay time is cut to a minimum, or is practically eliminated, thereby ensuring a high degree of accuracy in achieving the correct resistance value by the automatic calibrating means described herein.

In the specification, we have explained the principles of our invention, and the best mode in which we have contemplated applying those principles, so as to distinguish our invention from other inventions; and we have particularly pointed out and distinctly claimed the part, mode or combination which we claim as our invention or discovery.

While we have shown and described certain preferred embodiments of our invention, it will be understood that modifications and changes may be made without departing from the function and scope thereof, as will be clear to those skilled in the art.

We claim:

1. Apparatus for processing a film deposited ceramic-base resistor comprising means for rotating said resistor around its longitudinal axis, means for projecting a stream of abrasive particles against the surface of said resistor while the latter rotates, said projecting means being positioned in sufficiently close proximity to the surface of the resistor whereby the abrasive particles are projected in a restricted narrow stream against a limited area only on the surface of said resistor to produce a sharp cut through said film to the base of the resistor, said proximity being controlled as to limit the width of the stream of abrasives to a dimension substantially equivalent to the desired width of the path to be cut through the film, means for moving said projecting means in the direction of said axis at a controlled rate of speed whereby a helical path in said film is completely removed from said resistor down to the ceramic base thereof, means for continually measuring the resistance of said resistor as the helical path is being cut in said film, and means actuated by said measuring means for stopping the flow of said abrasive particles when a predetermined resistance is achieved.

2. Apparatus for processing a film deposited ceramic-base resistor comprising means for rotating said resistor around its longitudinal axis, means for projecting a stream of abrasive particles against the surface of said resistor while the latter rotates, said projecting means being positioned in sufficiently close proximity to the surface of the resistor whereby the abrasive particles are projected in a restricted narrow stream against a limited area only on the surface of said resistor to produce a sharp cut through said film to the base of the resistor, said proximity being controlled as to limit the width of the stream of abrasives to a dimension substantially equivalent to the desired width of the path to be cut through the film, means for moving said projecting means in the direction of said axis at a controlled rate of speed whereby a helical path in said film is completely removed from said resistor down to the ceramic base thereof, chucking means for said resistor, a pivoting mounting for said projecting means, and tracking means engageable by said mounting, said tracking means being shaped to cause said projecting means to move substantially parallel to the surface of said resistor and to move in an oblique path opposite said chucking means to avoid colliding with the latter.

3. The method for increasing the resistance value of a film deposited ceramic-base resistor which comprises removing a narrow helical strip from the film on said resistor by projecting abrasive particles in a narrow stream against the surface of said resistor, maintaining the source of said stream of abrasives in sufficiently close proximity to the surface of the resistor in order to insure that said abrasives will impinge upon a limited area only on the surface of said resistor to produce a sharply defined cut through said film to the base of the resistor, rotating said resistor while the abrasive particles are being projected, and moving said stream of particles in a direction substantially parallel to the axis of rotation of said resistor and at a controlled rate of speed whereby a sharply defined helical path in said film is completely removed from said resistor down to the ceramic base thereof.

References Cited in the file of this patent

UNITED STATES PATENTS

| | | |
|---|---|---|
| 2,495,269 | Lindmark | Jan. 24, 1950 |
| 2,516,222 | Lindmark | July 25, 1950 |
| 2,590,819 | Huyett | Mar. 25, 1952 |
| 2,669,810 | Carlson | Feb. 23, 1954 |

FOREIGN PATENTS

| | | |
|---|---|---|
| 390,476 | Great Britain | June 29, 1931 |